United States Patent
Fujiwara et al.

(10) Patent No.: US 7,792,496 B2
(45) Date of Patent: Sep. 7, 2010

(54) TRANSMITTER RECEIVER UNIT AND ELECTRONIC APPARATUS USING SAME

(75) Inventors: Joji Fujiwara, Osaka (JP); Michiaki Tsuneoka, Osaka (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 11/898,600

(22) Filed: Sep. 13, 2007

(65) Prior Publication Data
US 2008/0070511 A1 Mar. 20, 2008

(30) Foreign Application Priority Data
Sep. 14, 2006 (JP) ............................. 2006-249074

(51) Int. Cl.
H04B 1/40 (2006.01)
H04B 1/10 (2006.01)
H04B 1/16 (2006.01)
H04B 1/06 (2006.01)
H04B 7/00 (2006.01)

(52) U.S. Cl. ..................... 455/75; 455/205; 455/275; 455/304

(58) Field of Classification Search .............. 455/42, 455/60, 62, 63.3, 71, 75, 113, 118, 119, 131, 455/136, 139, 164.1, 182.1, 192.1, 205, 269, 455/275, 304, 276.1
See application file for complete search history.

(56) References Cited

U.S. PATENT DOCUMENTS

| 5,736,959 | A | * | 4/1998 | Patterson et al. | ............ 342/354 |
| 6,084,541 | A | * | 7/2000 | Sayegh | ....................... 342/354 |
| 6,226,509 | B1 | * | 5/2001 | Mole et al. | .................. 455/302 |

FOREIGN PATENT DOCUMENTS

JP 2002-009679 1/2002

* cited by examiner

Primary Examiner—Eugene Yun
(74) Attorney, Agent, or Firm—Wenderoth, Lind & Ponack, LLP.

(57) ABSTRACT

A transmitter receiver unit of the present invention comprises a phase shifter connected between a transistor and a filter multiplexer for decreasing a reactance component of an impedance, as observed from the transistor toward the filter multiplexer, to a value close to zero in a third frequency band given as the sum or difference between the integer multiples of a second frequency band and a first frequency band. This structure decreases the impedance in the third frequency band of the filter multiplexer side as observed from the transistor, thereby making the transistor not liable to generate a signal voltage of the third frequency band.

7 Claims, 6 Drawing Sheets

TRANSMITTER RECEIVER UNIT AND ELECTRONIC APPARATUS USING SAME

TECHNICAL FIELD

The present invention relates to a transmitter receiver circuit for processing signals transmitted to or received from an antenna, and an electronic apparatus such as a portable terminal using this circuit.

BACKGROUND ART

Description is provided hereinafter of a conventional transmitter receiver unit with reference to FIG. 10 and FIG. 11.

FIG. 10 is a circuit diagram of the conventional transmitter receiver unit. In FIG. 10, conventional transmitter receiver unit 1 comprises antenna terminal 2, transistor 3 and filter multiplexer 4. Transistor 3 is connected with antenna terminal 2, and it functions as a switch for selecting a communication system from among a plurality of them. Filter multiplexer 4 is connected to transistor 3, and it has receiving terminal 5 and transmitting terminal 6. Receiving terminal 5 is connected to filter multiplexer 4, while also branched and connected with a receiver circuit (not shown in the figure), which receives a signal of a first frequency band from filter multiplexer 4. Transmitting terminal 6 is connected to filter multiplexer 4, while also branched and connected with a transmitter circuit (not shown), which gives an input signal of a second frequency band to filter multiplexer 4.

FIG. 11 is a schematic illustration showing a relation of frequencies covering individual communication bands used for the conventional transmitter receiver unit. In FIG. 11, the first frequency band used as a receiving frequency and the second frequency band used as a transmitting frequency, for example, are 881.5 MHz-band and 836.5 MHz-band respectively. This structure, in particular, is used for communication systems that carry out the functions of transmission and reception simultaneously such as CDMA ("Code Division Multiple Access"). Japanese Patent Unexamined Publication, No. 2002-9679 is one example of such prior art documents known to be relevant to the invention of this patent application.

Due to the distortion characteristic of transistor 3, however, the signal of the second frequency band (836.5 MHz) input to transistor 3 from transmitting terminal 6 through filter multiplexer 4 is mixed with a signal of a third frequency band (e.g., 791.5 MHz) contained in the signal input to transistor 3 from antenna terminal 2, thereby causing a distortion of the signal of the first frequency band (881.5 MHz), or the receiving frequency band. Here, the third frequency band is a frequency band produced by addition or subtraction between integer multiples of the second frequency band and the first frequency band. Consequently, the distorted signal of the first frequency band containing information of other systems as well as information of the transmission signal passes through filter multiplexer 4, which is then input to the receiver circuit through receiving terminal 5, and it becomes an interfering signal in the receiver circuit.

SUMMARY OF THE INVENTION

The present invention provides a transmitter receiver unit capable of suppressing generation of distorted signal within a transistor connected to a filter multiplexer.

The transmitter receiver unit of the present invention comprises an antenna terminal, a transistor connected to the antenna terminal, a filter multiplexer connected to the transistor, a receiving terminal branched and connected to the filter multiplexer for inputting a signal of a first frequency band from the filter multiplexer to a receiver circuit, and a transmitting terminal branched and connected to the filter multiplexer for inputting a signal of a second frequency band from a transmitter circuit to the filter multiplexer. In addition, there is a phase shifter connected between the transistor and the filter multiplexer for the function of decreasing a reactance component of an impedance, as observed from the transistor toward the filter multiplexer, to a value close to zero in a third frequency band given as the sum or difference between the integer multiples of the second frequency band and the first frequency band.

By virtue of the above structure, the impedance is decreased in the third frequency band as observed from the transistor toward the filter multiplexer, thereby making the transistor not liable to produce a signal voltage of the third frequency band. As a result, the structure can suppress generation in the transistor of a distorted signal of the first frequency band containing information of other systems as well as information of the transmission signal.

Figure 1A:
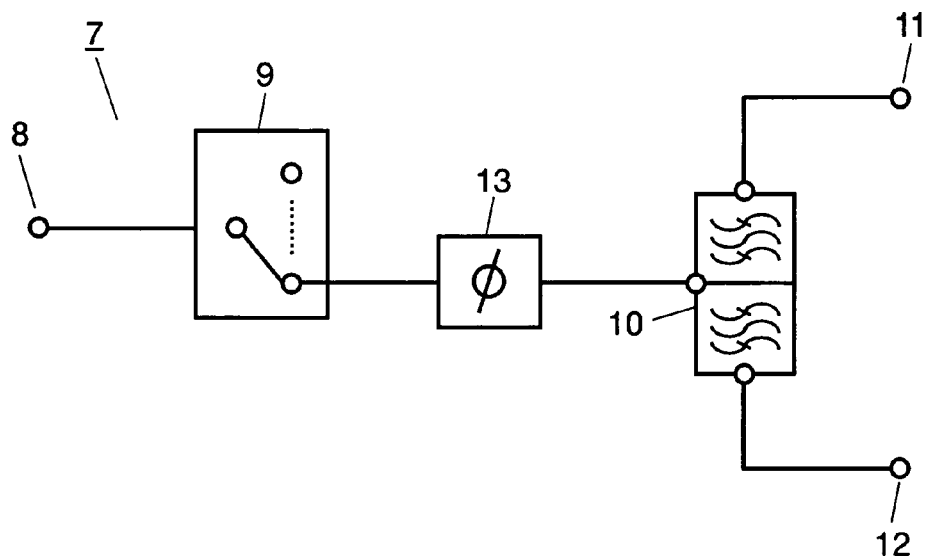
FIG. 1A is a circuit diagram of a transmitter receiver unit according to a first exemplary embodiment of the present invention.

REFERENCE MARKS IN THE DRAWINGS 7 transmitter receiver unit
8 antenna terminal
9 transistor
10 filter multiplexer
11 receiving terminal
12 transmitting terminal
13 phase shifter
18 notch filter

DETAILED DESCRIPTION OF PREFERRED EMBODIMENTS

First Exemplary Embodiment

Description is provided hereinafter of the first exemplary embodiment of the present invention with reference to FIG. 1.

FIG. 1A is a circuit diagram of a transmitter receiver unit according to the first exemplary embodiment of this invention. In FIG. 1A, transmitter receiver unit 7 comprises antenna terminal 8, transistor 9, phase shifter 13 and filter multiplexer 10. Transistor 9 is connected with antenna terminal 8, and it functions as a switch for selecting a communication system from among a plurality of them. Filter multiplexer 10 is connected to transistor 9, and it has receiving terminal 11 and transmitting terminal 12. Receiving terminal 11 is connected to filter multiplexer 10, while also branched and connected with a receiver circuit (not shown in the figure), which receives a signal of a first frequency band from filter multiplexer 10. Transmitting terminal 12 is connected to filter multiplexer 10, while also branched and connected to a transmitter circuit (not shown), which provides an input signal of a second frequency band to filter multiplexer 10.

Phase shifter 13 is disposed between transistor 9 and filter multiplexer 10, and it functions to decrease a reactance component of an impedance, as observed from transistor 9 toward filter multiplexer 10, to a value close to zero in a third frequency band given as the sum or difference between the integer multiples of the second frequency band and the first frequency band.

Figure 1B:
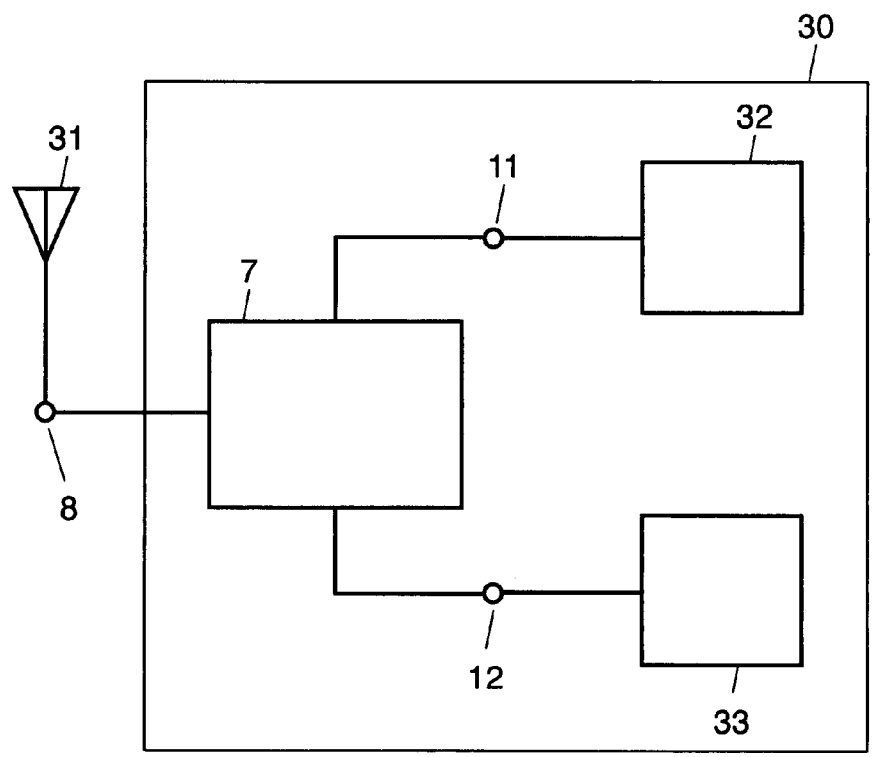
FIG. 1B is a block diagram of an electronic apparatus equipped with the transmitter receiver unit according to the first exemplary embodiment of the present invention.

FIG. 1B is a block diagram of an electronic apparatus equipped with the transmitter receiver unit according to the first exemplary embodiment of this invention. In FIG. 1B, electronic apparatus 30 equipped with transmitter receiver unit 7 comprises antenna 31 capable of transmitting and receiving signals of a plurality of frequency bands, which is connected to antenna terminal 8 for transmitting and receiving signals of a plurality of radio communication systems, receiver circuit 32 for receiving a signal of the first frequency band, and transmitter circuit 33 for transmitting a signal of the second frequency band.

Figure 2:
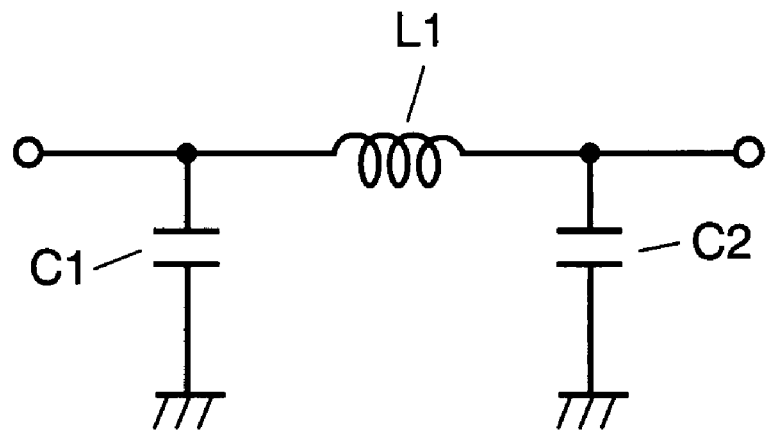
FIG. 2 is a circuit diagram of a phase shifter in the transmitter receiver unit according to the first exemplary embodiment of the invention.
Figure 3:
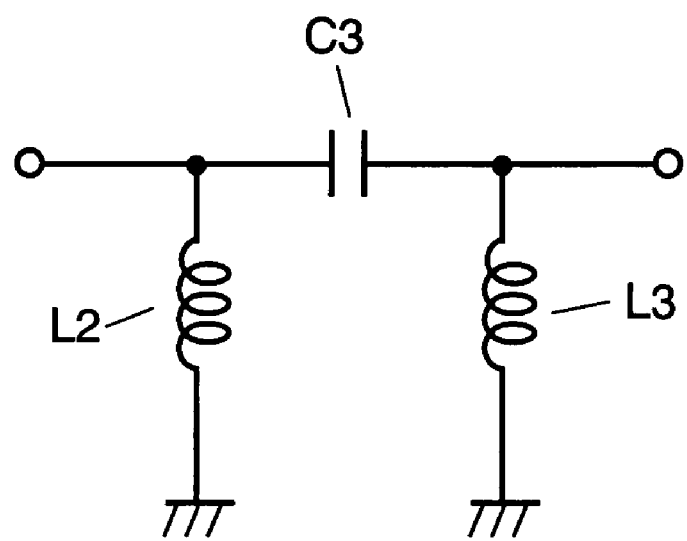
FIG. 3 is a circuit diagram of another phase shifter in the transmitter receiver unit according to the first exemplary embodiment of the invention.

FIG. 2 and FIG. 3 are circuit diagrams of phase shifters in the transmitter receiver unit according to the first exemplary embodiment of this invention. Phase shifter 13 is configured on any of a resin substrate and an LTCC ("Low Temperature Co-fired Ceramics") substrate, and that it may be a transmission line having an adjusted length. Alternatively, it may be a p-type low-pass filter comprised of two capacitors C1 and C2 connected to a grounding shunt, and inductor L1 connected between these two capacitors C1 and C2, as shown in FIG. 2. Or, it may be a p-type high-pass filter comprised of two inductors L2 and L3 connected to the grounding shunt, and capacitor C3 connected between these two inductors L2 and L3, as shown in FIG. 3. It is desirable here that phase shifter 13 has a characteristic impedance of 50Ω±10Ω. As a result, there can be achieved a reduction in signal transmission loss of phase shifter 13. Assume that transmitter receiver unit 7 is a device used for wireless communication system of WCDMA850, description is provided next of how it operates. As used herein, the term "WCDMA850" means a specification for carrying out wireless communications in an 850 MHz band by using the method of WCDMA ("Wideband Code Division Multiple Access").

In transistor 9 of FIG. 1A, a signal of the second frequency band (836.5 MHz) input to it from transmitting terminal 12 through filter multiplexer 10 is mixed with another signal of the third frequency band (e.g., 791.5 MHz) contained in a signal input to it from antenna terminal 8. This generates a distorted signal of the first frequency band (881.5 MHz), which is the receiving frequency band. Here, the third frequency band (791.5 MHz) is a frequency band produced by subtraction of the first frequency band (881.5 MHz) from two times the second frequency band (836.5 MHz). As a consequence, the distorted signal of the first frequency band (881.5 MHz) containing information of other systems as well as information of the transmission signal passes through filter multiplexer 10, which is input through receiving terminal 5 to receiver circuit 32 of FIG. 1B, and it then becomes an interfering signal for receiver circuit 32.

It is for this reason that the reactance component of the impedance is decreased to the value close to zero in the third frequency band (791.5 MHz), as observed from transistor 9 toward filter multiplexer 10, by means of phase shifter 13 connected between transistor 9 and filter multiplexer 10, so as to reduce the impedance toward filter multiplexer 10 as observed from transistor 9. Since this phase shifter 13 reduces the impedance toward filter multiplexer 10 in the third frequency band (791.5 MHz), as observed from transistor 9, it makes transistor 9 not liable to generate a signal voltage of the third frequency band (791.5 MHz). As a result, it can suppress generation in transistor 9 of a distorted signal of the first frequency band (881.5 MHz) containing information of other systems as well as information of the transmission signal.

Figure 4:
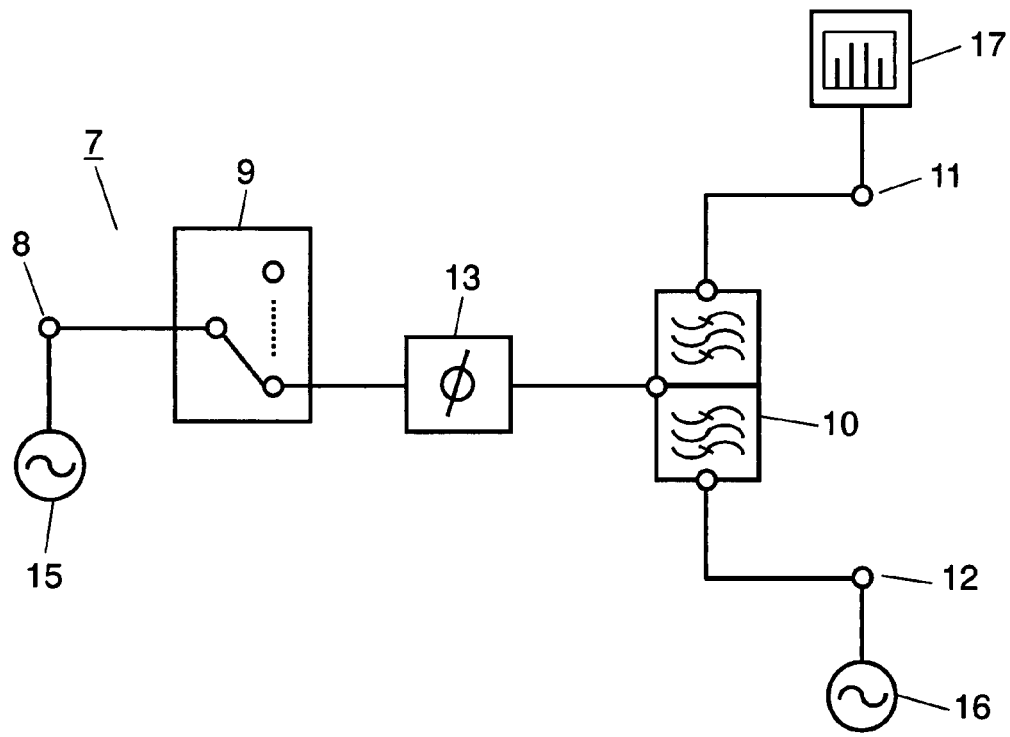
FIG. 4 is a circuit diagram used for an experimental measurement of distorted signal of the transmitter receiver unit according to the first exemplary embodiment of the invention.
Figure 5:
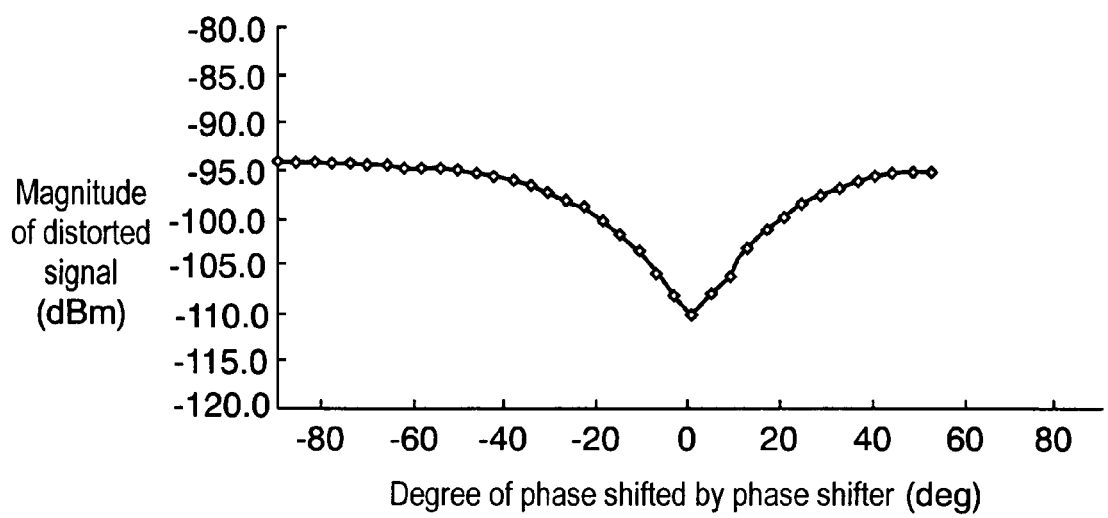
FIG. 5 is a graphical representation showing magnitudes of the distorted signal generated with respect to degrees of phase shifted by the phase shifter of the transmitter receiver unit according to the first exemplary embodiment of the invention.

Referring now to FIG. 4 and FIG. 5, description is provided next of an experiment conducted by using transmitter receiver unit 7 of this exemplary embodiment.

FIG. 4 is a circuit diagram used for the experiment of measuring the distorted signal of the transmitter receiver unit according to the first exemplary embodiment of this invention. The experiment was conducted with signal generator 15 connected to antenna terminal 8 of transmitter receiver unit 7 for generating a signal, another signal generator 16 connected to transmitting terminal 12 for generating another signal, and spectrum analyzer 17 connected to receiving terminal 11 for measuring a level of receiving signal, as illustrated in FIG. 4.

A −15 dBm signal of the third frequency band (791.5 MHz) was input from signal generator 15, and a 20 dBm signal of the second frequency band (836.5 MHz) was input from signal generator 16. A distorted signal of the first frequency band (881.5 MHz) generated in transistor 9 was measured with spectrum analyzer 17 while varying a degree of phase shifted by phase shifter 13. FIG. 5 shows a result of the measurements.

FIG. 5 is a graphical representation showing magnitude of the distorted signal generated with respect to the degree of phase shifted by the phase shifter of the transmitter receiver unit according to the first exemplary embodiment of this invention. In FIG. 5, the abscissa is graduated in degrees of the phase shifted by phase shifter 13, in which 0 degree represents the phase that makes the reactance component of the impedance become zero, as observed from transistor 9 toward filter multiplexer 10. The ordinate represents magnitude of the distorted signal (in dBm) generated in transistor 9, and measured with spectrum analyzer 17.

As is obvious from FIG. 5, the magnitude of the distorted signal of the first frequency band (881.5 MHz) generated in transistor 9 can be decreased to 5 dBm or more when the degree of phase shifted by phase shifter 13 is in a range of ±20 degrees from the point where the reactance component of the impedance becomes zero, as observed from transistor 9 toward filter multiplexer 10. Furthermore, the magnitude of the distorted signal of the first frequency band (881.5 MHz) generated in transistor 9 can be decreased to 10 dBm or more when the degree of phase shifted by phase shifter 13 is in a range of ±10 degrees from the point where the reactance component of the impedance becomes zero, as observed from transistor 9 toward filter multiplexer 10.

Figure 6:
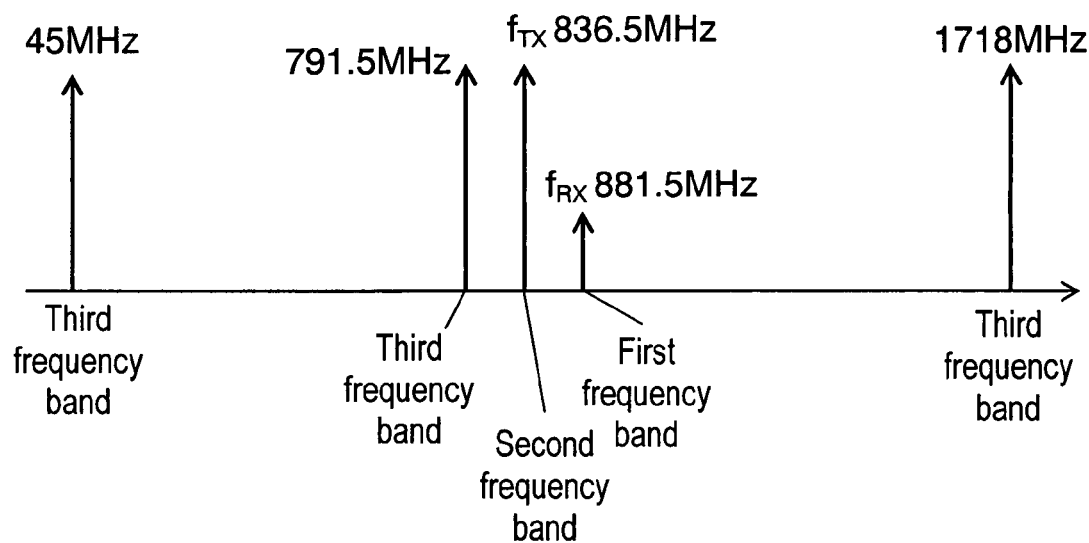
FIG. 6 is a schematic illustration showing a relation of frequencies covering individual communication bands used for the transmitter receiver unit according to the first exemplary embodiment of the invention.

FIG. 6 is a schematic illustration showing a relation of frequencies covering individual communication bands used for the transmitter receiver unit according to the first exemplary embodiment of this invention. In the instance of FIG. 6, phase shifter 13 may be such a device that can make the reactance component of the impedance to a value close to zero, as observed from transistor 9 toward filter multiplexer 10, in any of a 1,718 MHz band given as the sum of the second frequency band (836.5 MHz) and the first frequency band (881.5 MHz), and a 45 MHz band given by subtraction of the second frequency band (836.5 MHz) from the first frequency band (881.5 MHz). In this case, any of the 1,718 MHz band and the 45 MHz band is treated as the third frequency band. This embodiment can thus suppress generation in transistor 9 of a distorted signal of the first frequency band (881.5 MHz) containing information of other systems as well as information of the transmission signal.

Second Exemplary Embodiment

Description is provided hereinafter of the second exemplary embodiment of this invention with reference to FIG. 7. Like reference marks are used throughout to designate components of like structures as those of the first exemplary embodiment, and their details are skipped. Description given herein will cover only different components.

Figure 7:
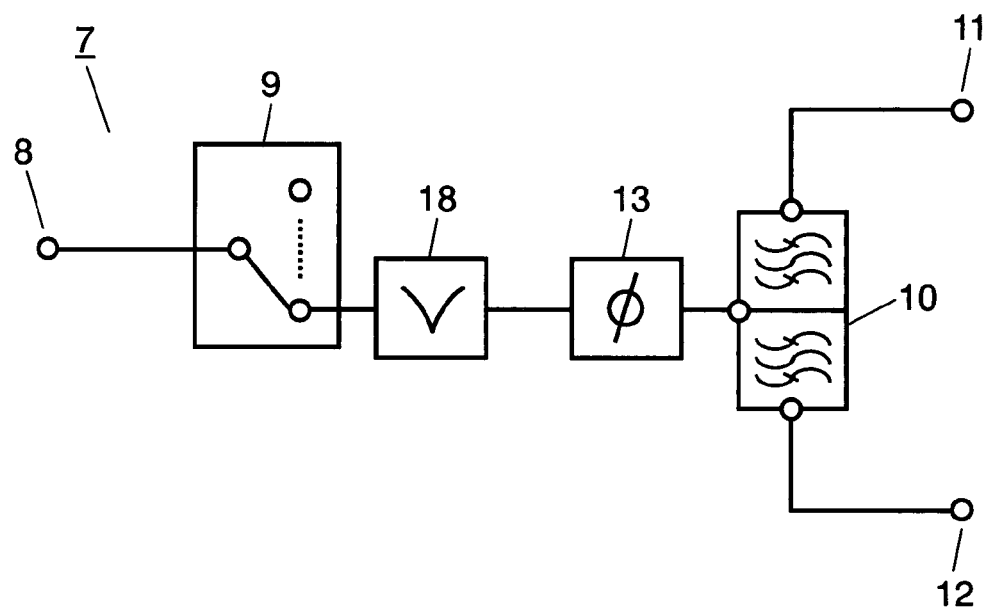
FIG. 7 is a circuit diagram of a transmitter receiver unit according to a second exemplary embodiment of the present invention.

FIG. 7 shows a circuit diagram of a transmitter receiver unit according to the second exemplary embodiment of this invention. In FIG. 7, this exemplary embodiment differs from the first exemplary embodiment in a respect that this embodiment comprises notch filter 18 connected between transistor 9 and filter multiplexer 10.

Figure 8A:
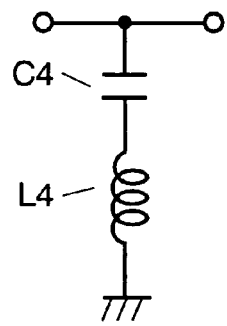
FIG. 8A is a circuit diagram of a notch filter in the transmitter receiver unit according to the second exemplary embodiment of the invention.
Figure 8B:
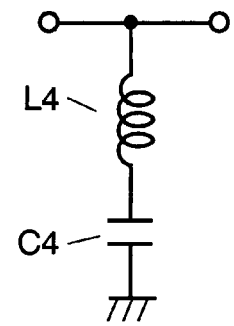
FIG. 8B is a circuit diagram of another notch filter in the transmitter receiver unit according to the second exemplary embodiment of the invention.

FIG. 8A and FIG. 8B are circuit diagrams of notch filters for the transmitter receiver unit according to the second exemplary embodiment of this invention. Notch filter 18 in any of FIG. 8A and FIG. 8B comprises a series resonator of capacitor C4 and inductor L4 connected to a grounding shunt.

Notch filter 18 attenuates a signal of a fourth frequency band produced by addition or subtraction between the integer multiples of a second frequency band, i.e. a transmission frequency band, and a first frequency band, i.e. a receiving frequency band. A difference between this fourth frequency band and the second frequency band is greater than a difference between the third frequency band and the second frequency band.

In this example, phase shifter 13 shifts a phase of the impedance in the third frequency band (791.5 MHz) as observed from transistor 9 toward the filter multiplexer, and notch filter 18 attenuates the signal of the fourth frequency band (1,718 MHz) produced by addition of the second frequency band (836.5 MHz), i.e. the transmission frequency band, and the first frequency band (881.5 MHz), i.e. the receiving frequency band.

A signal voltage of the fourth frequency band (1,718 MHz) is thus suppressed in a passage from antenna terminal 8 by virtue of this notch filter 18, and it makes transistor 9 not liable to generate a signal voltage of the fourth frequency band (1,718 MHz). As a result, it can suppress generation in transistor 9 of the distorted signal of the first frequency band (881.5 MHz) containing information of other systems as well as information of the transmission signal.

The third frequency band (791.5 MHz) is in close proximity to the first frequency band (881.5 MHz), i.e. the receiving frequency band, and the second frequency band (836.5 MHz), i.e. the transmission frequency band. For this reason, when notch filter 18 is used to attenuate the interfering signal of the third frequency band (791.5 MHz) it also attenuates both the receiving signal of the first frequency band (881.5 MHz) and the transmission signal of the second frequency band (836.5 MHz). It is therefore desirable that phase shifter 13 is used to suppress generation of the distorted signal in transistor 9 when the interference frequency band is close to the receiving frequency band and the transmission frequency band, and notch filter 18 is used to suppress the distorted signal in transistor 9 when the interference frequency band is separated by far from the receiving frequency band and the transmission frequency band, as discussed in the second exemplary embodiment Although notch filter 18 may be connected between antenna terminal 8 and transistor 9, it is more preferable to connect it between transistor 9 and filter multiplexer 10. This can avoid notch filter 18 from becoming a cause of deteriorating signals of other communication systems connected to the switch of transistor 9.

Figure 9A:
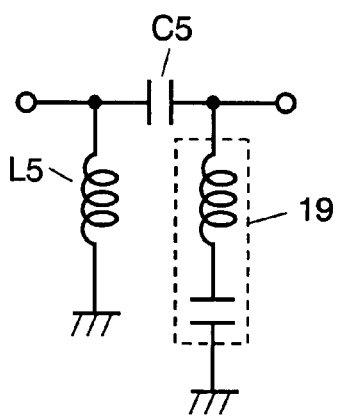
FIG. 9A is a diagram of a circuit having functions of both phase shifter and notch filter in the transmitter receiver unit according to the second exemplary embodiment of the invention.
Figure 9B:
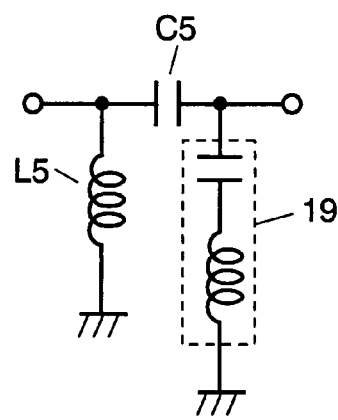
FIG. 9B is a diagram of another circuit having the functions of both phase shifter and notch filter in the transmitter receiver unit according to the second exemplary embodiment of the invention.
Figure 9C:
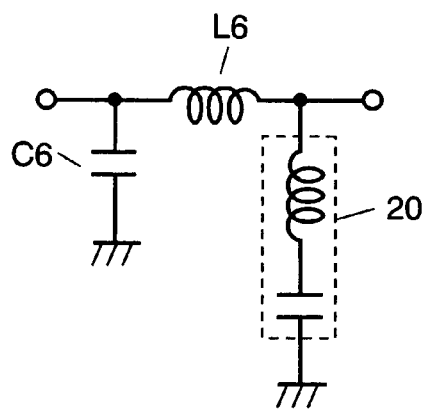
FIG. 9C is a diagram of still another circuit having the functions of both phase shifter and notch filter in the transmitter receiver unit according to the second exemplary embodiment of the invention.
Figure 9D:
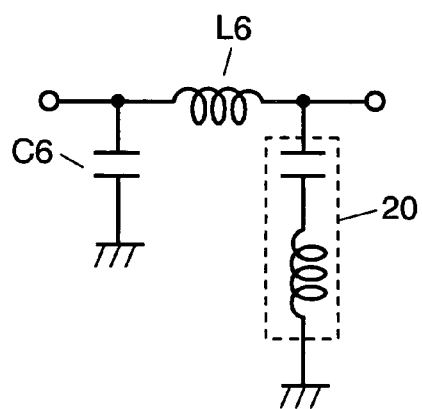
FIG. 9D is a diagram of yet another circuit having the functions of both phase shifter and notch filter in the transmitter receiver unit according to the second exemplary embodiment of the invention.
Figure 10:
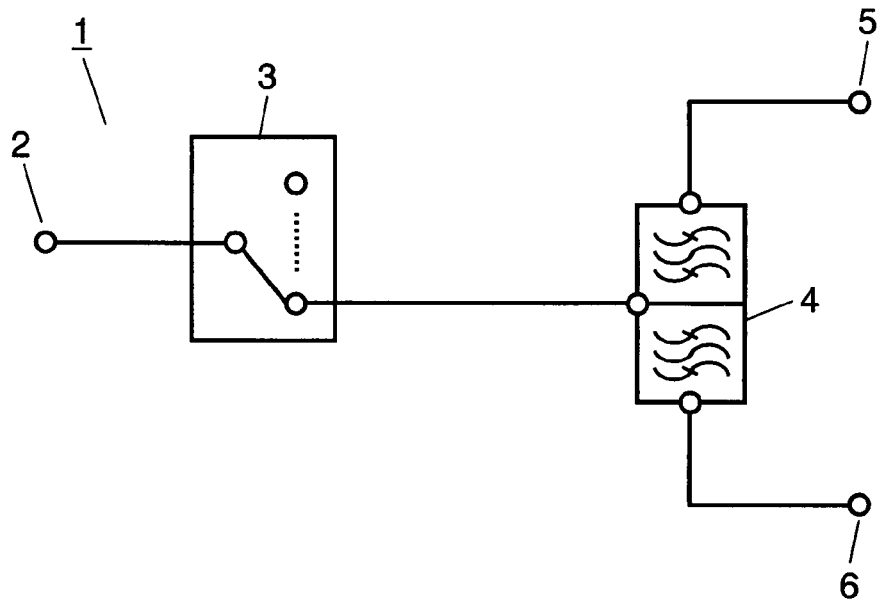
FIG. 10 is a circuit diagram of a conventional transmitter receiver unit.
Figure 11:
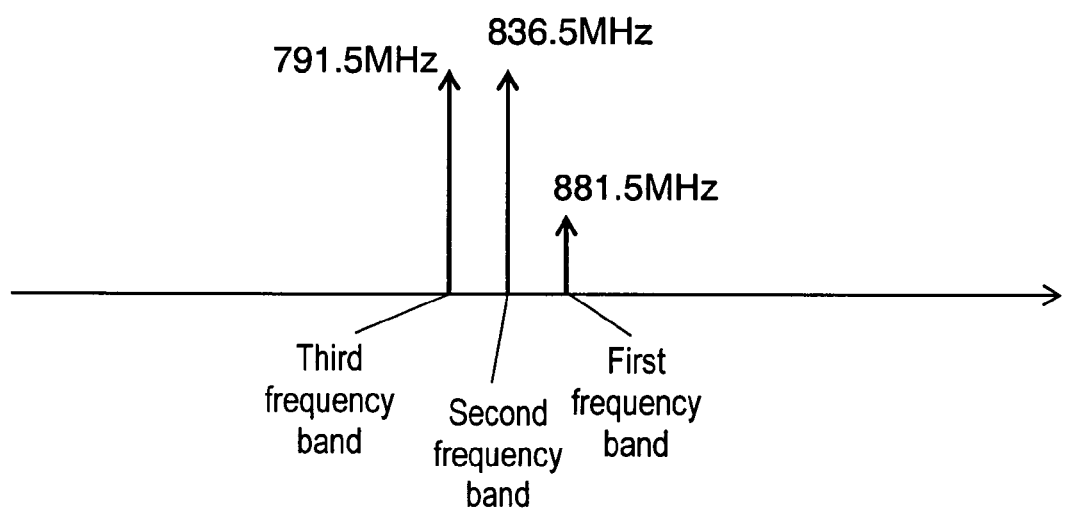
FIG. 11 is a schematic illustration showing a relation of frequencies covering individual communication bands used for the conventional transmitter receiver unit.

FIGS. 9A, 9B, 9C and 9D are diagrams of various circuits having functions of both the phase shifter and the notch filter in the transmitter receiver unit according to the second exemplary embodiment of this invention. The circuits containing both phase shifter 13 and notch filter 18 can be composed of series resonator 19 connected to the grounding shunt, inductor L5 also connected to the grounding shunt, and capacitor C5 connected in series between these components, as shown in FIGS. 9A and 9B. Or, the circuits may be composed of series resonator 20 connected to the grounding shunt, capacitor C6 also connected to the grounding shunt, and inductor L6 connected in series between these components, as shown in FIGS. 9C and 9D. As shown, any such combination of phase shifter 13 and notch filter 18 can reduce a number of the circuit components, thereby helping miniaturize transmitter receiver unit 7. Alternatively, notch filter 18 may even be formed inside transistor 9 functioning as the switch.

When notch filter 18 is formed inside transistor 9 in this manner, it can further reduce the magnitude of distorted signal generated in transistor 9 due to the interfering wave of the fourth frequency band. Since this structure can also suppress the magnitude of distorted signal of the first frequency band generated by the transistor, it is useful for application in electronic apparatuses such as portable terminals and broadcasting receivers.

The invention claimed is:

1. A transmitter receiver unit comprising:
an antenna terminal;
a transistor connected to the antenna terminal;
a filter multiplexer connected to the transistor;
a receiving terminal branched and connected to the filter multiplexer, for inputting a signal of a first frequency band from the filter multiplexer to a receiver circuit; and
a transmitting terminal branched and connected to the filter multiplexer, for inputting a signal of a second frequency band from a transmitter circuit to the filter multiplexer,
wherein the transmitter receiver unit further includes a phase shifter connected between the transistor and the filter multiplexer for decreasing a reactance component of an impedance, as observed from the transistor toward the filter multiplexer, to a value close to zero in a third frequency band given as the sum or difference between the integer multiples of the second frequency band and the first frequency band.

2. The transmitter receiver unit of claim 1, wherein a degree of phase shifted by the phase shifter is in a range of ±20 degrees from a point where the reactance component of the impedance becomes zero, as observed from the transistor toward the filter multiplexer.

3. The transmitter receiver unit of claim 1, wherein a degree of phase shifted by the phase shifter is in a range of ±10 degrees from a point where the reactance component of the impedance becomes zero, as observed from the transistor toward the filter multiplexer.

4. The transmitter receiver unit of claim 1, wherein the phase shifter decreases the reactance component of the impedance to a value close to zero in a frequency band given by subtracting the first frequency band from two times the second frequency band.

5. The transmitter receiver unit of claim 1 further comprising a notch filter connected between the antenna terminal and the transistor for attenuating a signal of a fourth frequency band produced by addition or subtraction between the integer multiples of the second frequency band and the first frequency band, wherein the third frequency band is a different frequency band from the fourth frequency band.

6. The transmitter receiver unit of claim 5, wherein a difference between the fourth frequency band and the second frequency band is greater than a difference between the third frequency band and the second frequency band.

7. An electronic apparatus comprising:
an antenna;
a transistor connected to the antenna;
a filter multiplexer connected to the transistor;
a receiver circuit branched and connected to the filter multiplexer, for receiving a signal of a first frequency band; and
a transmitter circuit branched and connected to the filter multiplexer, for transmitting a signal of a second frequency band,
wherein the electronic apparatus further has a phase shifter connected between the transistor and the filter multiplexer for decreasing a reactance component of an impedance, as observed from the transistor toward the filter multiplexer, to a value close to zero in a third frequency band given as the sum or difference between the integer multiples of the second frequency band and the first frequency band.

* * * * *